(12) United States Patent
Tan et al.

(10) Patent No.: US 9,151,121 B2
(45) Date of Patent: Oct. 6, 2015

(54) BUOYANCY COMPENSATING ELEMENT AND METHOD

(71) Applicant: Wellstream International Limited, Newcastle-upon-Tyne, Tyne and Wear (GB)

(72) Inventors: Zhimin Tan, Katy, TX (US); George Karabelas, Houghton le Spring (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 0 days.

(21) Appl. No.: 14/358,611

(22) PCT Filed: Oct. 19, 2012

(86) PCT No.: PCT/GB2012/052600
§ 371 (c)(1),
(2) Date: May 15, 2014

(87) PCT Pub. No.: WO2013/079915
PCT Pub. Date: Jun. 6, 2013

(65) Prior Publication Data
US 2014/0326460 A1     Nov. 6, 2014

(30) Foreign Application Priority Data

Nov. 29, 2011     (GB) .................................. 1120534.1

(51) Int. Cl.
*E21B 17/01* (2006.01)
*F16L 1/24* (2006.01)
(Continued)

(52) U.S. Cl.
CPC ............. *E21B 17/015* (2013.01); *E21B 17/012* (2013.01); *E21B 17/105* (2013.01); *F16L 1/163* (2013.01); *F16L 1/24* (2013.01); *F16L 11/133* (2013.01)

(58) Field of Classification Search
CPC ... E21B 17/012; E21B 17/015; E21B 17/017; F16L 1/24
USPC ............ 166/350, 367; 405/168.1, 168.2, 171; 441/133
See application file for complete search history.

(56) References Cited

U.S. PATENT DOCUMENTS 3,496,526 A *   2/1970   Rockwell ......................... 367/17
3,594,835 A *   7/1971   Wilson ........................... 441/133
(Continued)

FOREIGN PATENT DOCUMENTS

CN         101517165 A      8/2009
EP         1260670 A1       11/2002
(Continued)

OTHER PUBLICATIONS

International Preliminary Report on Patentability and Written Opinion of the International Searching Authority, mailed Jun. 12, 2014, for corresponding International Application No. PCT/GB2012/052600, 9 pages.

(Continued)

*Primary Examiner* — Matthew Buck
(74) *Attorney, Agent, or Firm* — Klarquist Sparkman, LLP

(57) ABSTRACT

A buoyancy compensating element for connection to a flexible pipe and method of producing a buoyancy compensating element are disclosed for increasing or decreasing buoyancy of the portion of flexible pipe. The buoyancy compensating element includes a body portion; and a channel extending through the body portion for receiving a portion of flexible pipe, wherein the body portion and channel are configured such that when a portion of flexible pipe is received in the channel, the portion of pipe has increasing ability to flex towards an end of the channel.

6 Claims, 10 Drawing Sheets

(51) Int. Cl.
*E21B 17/10* (2006.01)
*F16L 1/16* (2006.01)
*F16L 11/133* (2006.01)

(56) References Cited

U.S. PATENT DOCUMENTS

| | | | |
|---|---|---|---|
| 6,524,152 B1* | 2/2003 | Dauphin et al. | 441/133 |
| 6,811,355 B2* | 11/2004 | Poldervaart | 405/169 |
| 7,214,114 B2* | 5/2007 | Gibson | 441/133 |
| 7,628,665 B1* | 12/2009 | Cook et al. | 441/133 |
| 2003/0026663 A1 | 2/2003 | Guesnon et al. | |
| 2003/0180097 A1* | 9/2003 | Fitzgerald et al. | 405/224.2 |
| 2008/0017385 A1* | 1/2008 | Gibson | 166/350 |
| 2008/0274656 A1* | 11/2008 | Routeau et al. | 441/133 |
| 2008/0317555 A1* | 12/2008 | De Aquino et al. | 405/195.1 |
| 2009/0269141 A1 | 10/2009 | Li et al. | |
| 2010/0018717 A1* | 1/2010 | Espinasse et al. | 166/346 |
| 2010/0284750 A1* | 11/2010 | Begley | 405/224.2 |
| 2011/0108281 A1* | 5/2011 | Baugh | 166/350 |
| 2012/0207547 A1* | 8/2012 | Guzick et al. | 405/166 |

FOREIGN PATENT DOCUMENTS

| | | |
|---|---|---|
| WO | WO2004/033848 A1 | 4/2004 |
| WO | WO2010/129191 A1 | 11/2010 |

OTHER PUBLICATIONS

International Search Report and Written Opinion of the International Searching Authority, mailed Nov. 28, 2013, for corresponding International Application No. PCT/GB2012/052600, 14 pages.

Notification of the First Office Action and Search Report (with English translation) from the State Intellectual Property Office of People's Republic of China for corresponding Chinese Application No. 201280058542.3, Jul. 3, 2015, 13 pages.

* cited by examiner

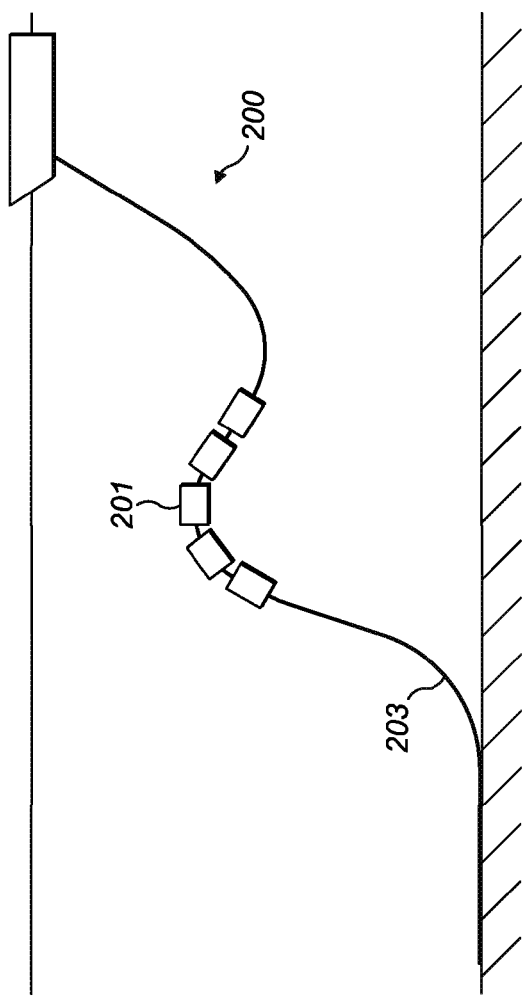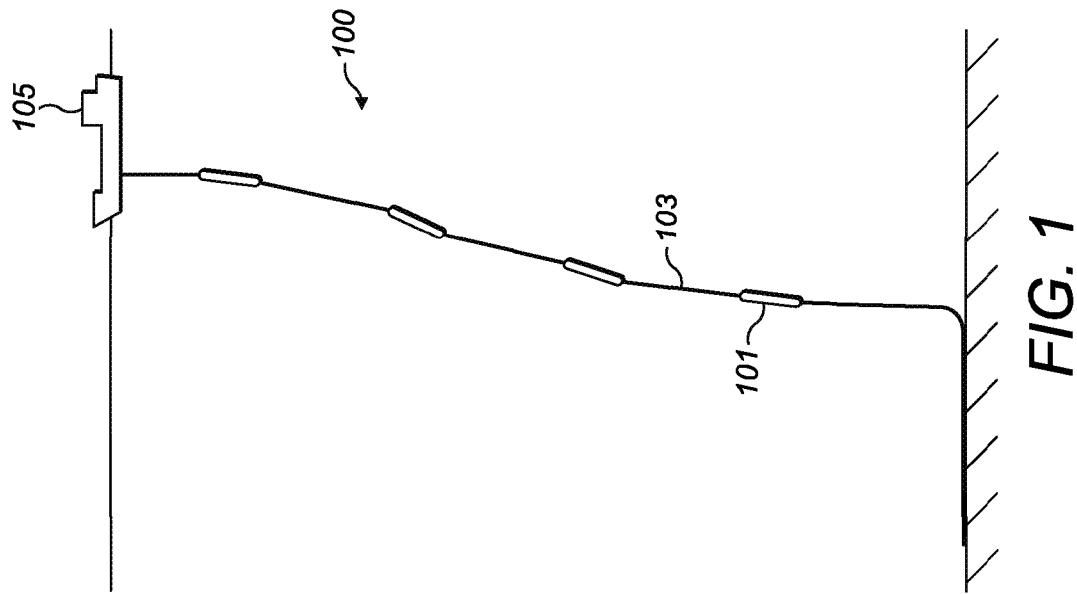

BUOYANCY COMPENSATING ELEMENT AND METHOD

CROSS REFERENCE TO RELATED APPLICATIONS

This is the U.S. National Stage of International Application No. PCT/GB2012/052600, filed Oct. 19, 2012, which in turn claims the benefit of and priority to United Kingdom Application No. GB 1120534.1, filed Nov. 29, 2011.

The present invention relates to a buoyancy compensating element or buoyancy compensating elements, and a method of providing the same. In particular, but not exclusively, the present invention relates to buoyancy compensating elements for connection to a flexible pipe for providing buoyancy to reduce tension and providing bending support to the flexible pipe, for example, in subsea use.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body often generally includes metallic and polymer layers.

In many known flexible pipe designs the pipe body includes one or more tensile armour layers. The primary loading on such a layer is tension. In high pressure applications, such as in deep and ultra deep water environments (deep water being considered as less than 3,300 feet (1,005.84 meters) and ultra deep water as greater than 3,300 feet), the tensile armour layer experiences high tension loads from a combination of the internal pressure end cap load and the self-supported weight of the flexible pipe. This can cause failure in the flexible pipe since such conditions are experienced over prolonged periods of time.

One technique which has been attempted in the past to in some way alleviate the above-mentioned problem is the addition of buoyancy aids at predetermined locations along the length of a riser. The buoyancy aids provide an upwards lift to counteract the weight of the riser, effectively taking a portion of the weight of the riser, at various points along its length. Employment of buoyancy aids involves a relatively lower installation cost compared to some other configurations, such as a mid-water arch structure, and also allows a relatively faster installation time.

An example of a known riser configuration using buoyancy aids to support the riser is a stepped riser configuration 100, such as disclosed in WO2007/125276 and shown in FIG. 1, in which buoyancy aids 101 are provided at discrete locations along a flexible pipe 103. The riser is suitable for transporting production fluid such as oil and/or gas and/or water from a subsea location to a floating facility 105 such as a platform or buoy or ship. A further example of a known riser configuration using buoyancy aids is a lazy wave configuration 200 shown in FIG. 2, in which buoyancy aids 201 are provided at points along a flexible pipe 203 so as to provide a 'hog bend' in the riser. The lazy wave configuration is often preferred for shallow water applications.

WO2007/125276 discloses a flexible pipe including rigid buoyancy supports at one or more points along a riser assembly. The rigid buoyancy support provides a rigid surface to affix buoyancy aids to the flexible pipe, thereby avoiding crushing of the flexible pipe due to compression loads being exerted as the buoyancy aid is attached.

Other riser configurations may require the addition of ballast weight to a flexible pipe to decrease the buoyancy of the pipe at one or more positions to suit a particular marine environment or production fluid extraction set up.

As used herein, the term "buoyancy compensating element" is used to encompass both buoyancy aids for increasing buoyancy and ballast weights for decreasing buoyancy.

It would be useful to provide a flexible pipe assembly that allowed the equipment and steps prior to installation of the flexible pipe assembly as easy to handle and convenient as possible.

It would also be useful to provide a flexible pipe assembly that allowed straightforward connection of additional buoyancy compensating elements, without exerting compression loads on the pipe.

In addition, it is known that a flexible pipe is, in use, subjected to dynamic loading due to vessel motion or tidal effects, for example, which can cause curvature changes in the riser configuration. Overbending can also occur when the flexible pipe is installed. It is generally advantageous to prevent overbending and control such changes within predetermined limits. A known solution is to add one or more bend stiffener to the flexible pipe at locations where overbending may occur. The bend stiffener may be added for example adjacent to an end fitting so as to gradually increase the allowable flexibility of the flexible pipe.

There are certain drawbacks with regard to the assembly and transportation of a flexible pipe assembly including a bend stiffener. A bend stiffener is generally threaded over a flexible pipe at the manufacturing plant, the pipe wound onto a reel for transportation to the installation site, and then payed out from the reel at the location of use. The bend stiffener itself is quite rigid and of fairly awkward shape in comparison to a flexible pipe, and therefore difficult to accommodate on a reel. This is usually dealt with by use of special packaging material, and requires a great deal of effort. Furthermore, the bend stiffener must be located at a specific point on the reel so as to not tip the reel off-balance.

It is an aim of embodiments of the present invention to provide a buoyancy compensating element and method that improves the ease of use and ease of handling prior to a flexible pipe assembly being installed, compared to known buoyancy compensating elements and methods.

It is an aim of embodiments of the present invention to provide a buoyancy compensating element that is retrofittable to a flexible pipe.

It is an aim of embodiments of the present invention to provide a buoyancy compensating element and method that is easy and cost-effective to install.

It is an aim of embodiments of the present invention to provide one or more buoyancy compensating element that is attachable to a midline connection of a flexible pipe.

It is an aim of embodiments of the present invention to provide an assembly that is easy to assemble and protects against overbending of a flexible pipe.

According to a first aspect of the present invention there is provided a buoyancy compensating element for connection to a portion of flexible pipe for increasing or decreasing buoyancy of the portion of flexible pipe, comprising:
    a body portion; and
    a channel extending through the body portion for receiving
      a portion of flexible pipe,
    wherein the body portion and channel are configured such
      that when a portion of flexible pipe is received in the channel, the portion of pipe has increasing ability to flex towards an end of the channel.

According to a second aspect of the present invention there is provided a method of providing a buoyancy compensating element for connection to a portion of flexible pipe for increasing or decreasing buoyancy of the portion of flexible pipe, comprising:

providing a body portion; and providing a channel extending through the body portion for receiving a portion of flexible pipe, wherein the body portion and channel are configured such that when a portion of flexible pipe is received in the channel, the portion of pipe has increasing ability to flex towards an end of the channel.

Certain embodiments of the invention provide the advantage that a buoyancy compensating element can be attached to a flexible pipe just prior to being payed out to its in-use location, thereby allowing the buoyancy compensating element to be stored and transported separately from the flexible pipe.

Certain embodiments of the invention provide the advantage that one or more buoyancy compensating elements are connectable together in series, whilst only attaching to a flexible pipe at a single, rigid point, i.e. the midline connection.

Certain embodiments of the invention provide the advantage that a flexible pipe assembly is provided that is protected from overbending.

Embodiments of the invention are further described hereinafter with reference to the accompanying drawings, in which:

FIG. 1 illustrates a known riser configuration;

FIG. 2 illustrates another known riser configuration;

FIG. 5 illustrates a buoyancy compensating element;

Figure 3:
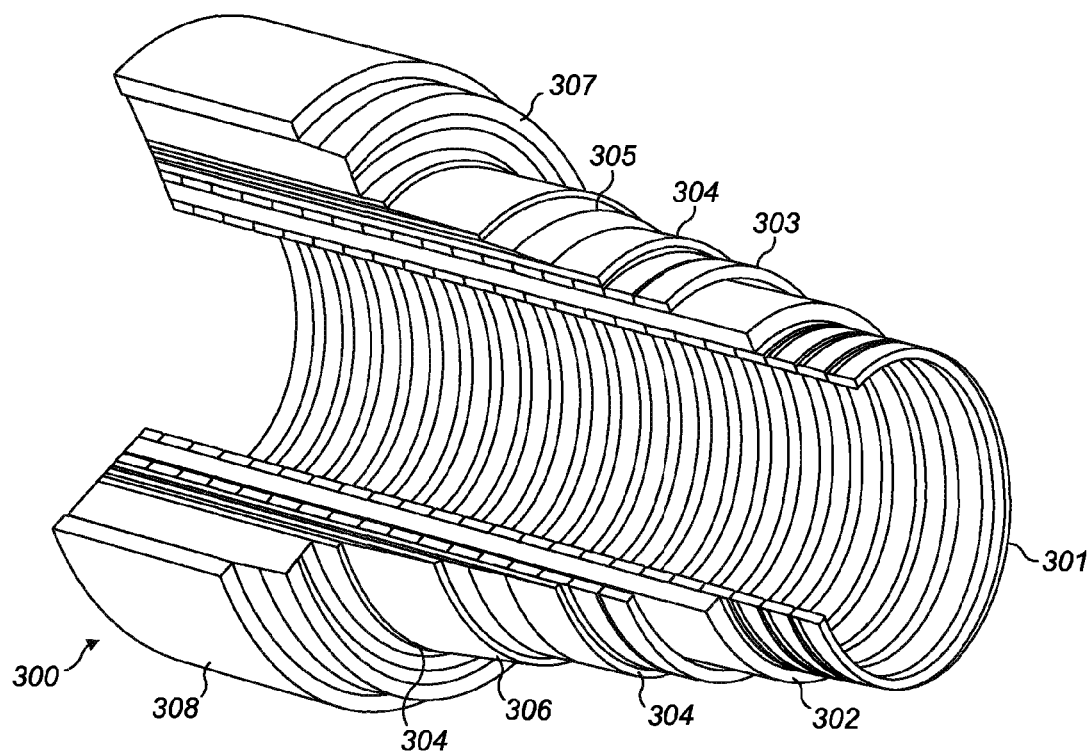
FIG. 3 illustrates a flexible pipe body.

In the drawings like reference numerals refer to like parts. Throughout this description, reference will be made to a flexible pipe. It will be understood that a flexible pipe is an assembly of a portion of a pipe body and one or more end fittings in each of which a respective end of the pipe body is terminated. FIG. 3 illustrates how pipe body 300 is formed in accordance with an embodiment of the present invention from a combination of layered materials that form a pressure-containing conduit. Although a number of particular layers are illustrated in FIG. 3, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 3, a pipe body includes an optional innermost carcass layer 301. The carcass provides an interlocked construction that can be used as the innermost layer to prevent, totally or partially, collapse of an internal pressure sheath 302 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 302 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 303 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 305 and optional second tensile armour layer 306. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 304 which help contain underlying layers and to some extent prevent abrasion between adjacent layers.

The flexible pipe body also typically includes optional layers of insulation 307 and an outer sheath 308, which comprises a polymer layer used to protect the pipe against penetration of seawater and other external environments, corrosion, abrasion and mechanical damage.

Each flexible pipe may comprise at least one portion, sometimes referred to as a segment or section of pipe body 300 together with an end fitting located at at least one end of the flexible pipe. An end fitting provides a mechanical device which forms the transition between the flexible pipe body and a connector. The different pipe layers as shown, for example, in FIG. 3 are terminated in the end fitting in such a way as to transfer the load between the flexible pipe and the connector.

Alternatively, a segment of flexible pipe body may be jointed to a further segment of pipe body by other types of midline connection, such as described in WO2009/150443. A midline connection is considered to be any connection between flexible pipe body segments that in use lies between the vessel or platform and seabed.

Figure 4:
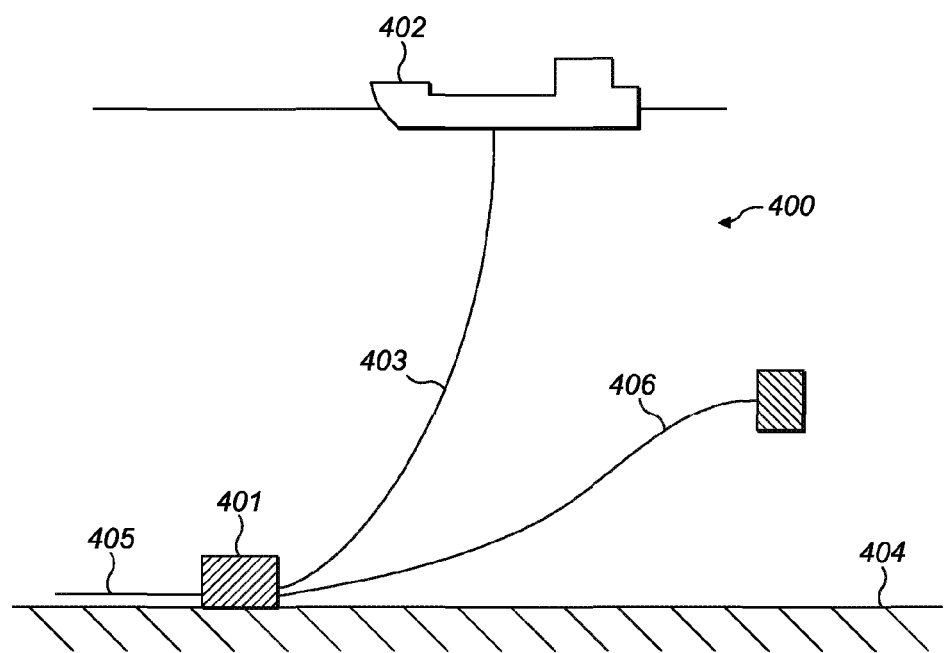
FIG. 4 illustrates a riser configuration.

FIG. 4 illustrates a riser assembly 400 suitable for transporting production fluid such as oil and/or gas and/or water from a sub-sea location 401 to a floating facility 402. For example, in FIG. 4 the sub-sea location 401 includes a sub-sea flow line. The flexible flow line 405 comprises a flexible pipe, wholly or in part, resting on the sea floor 404 or buried below the sea floor and used in a static application. The floating facility may be provided by a platform and/or buoy or, as illustrated in FIG. 4, a ship. The riser assembly 400 is provided as a flexible riser, that is to say a flexible pipe 403 connecting the ship to the sea floor installation. The flexible pipe may be in segments of flexible pipe body with connecting end fittings, as discussed above.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 4 also illustrates how portions of flexible pipe can be utilised as a flow line 405 or jumper 406.

An embodiment of the present invention is shown in FIGS. 5 to 11. A buoyancy compensating element (buoyancy aid) 500 includes a first body portion 502 and a further body portion 504. The body portions are connectable to each other to form the buoyancy compensating element. In the example shown, the buoyancy compensating element is split into two substantially identical portions.

Figure 6:
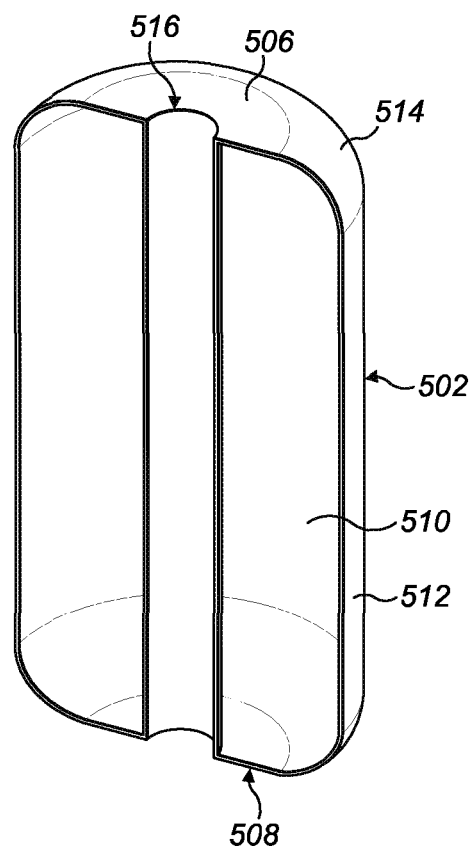
FIG. 6 illustrates a body portion of a buoyancy compensating element.

One body portion is shown in FIG. 6. The body portion 502 is generally semi-cylindrical, having a first generally semi-circular end surface 506, a second generally semi-circular end surface 508 opposed to the first end surface, a generally flat face 510 extending between the first and second end surfaces, and a curved surface 512 extending between the first and second end surfaces. In this example the outer faces of the body portion also include further curved portions 514 as transition surfaces.

The generally flat face 510 is interrupted by a cutaway portion 516 that extends between the first and second end surfaces 506,508. The cutaway portion 516 is itself semi-cylindrical.

Figure 5:
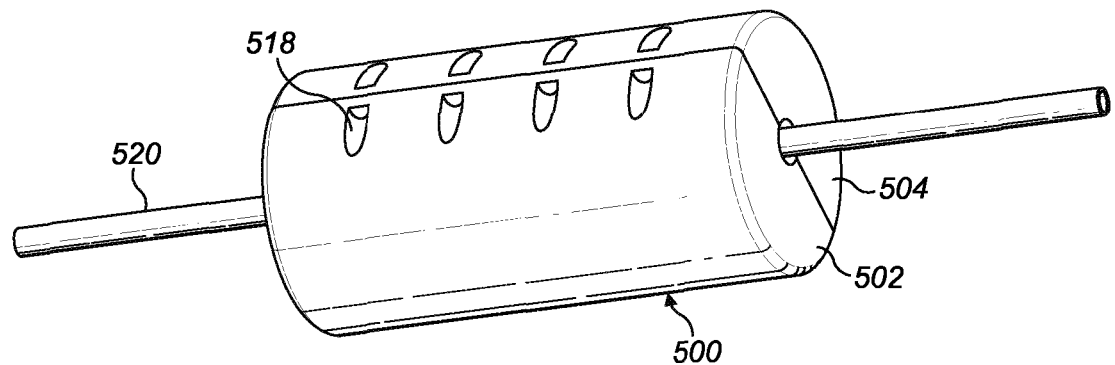
FIG. 5 illustrates a riser configuration.

The first and further body portions 502,504 are configured to be connectable to each other. As indicated in FIG. 5, the body portions may be joined by bolts (not shown) to secure the portions to each other. The bolts are inserted into appropriately sized hollowed cavities 518 and tightened. Alternatively it will be appreciated that many other forms of configuration could be used to connect the body portions, such as straps or other windings around the joined portions, or forms of adhesive or weldment, for example.

The cutaway portion 516 or each body portion is configured (sized and shaped) such that when the body portions are connected, the body portions will envelop a flexible pipe 520. Since the cutaway portions are semi-cylindrical, they will form a cylindrical channel to receive a flexible pipe.

Figure 8:
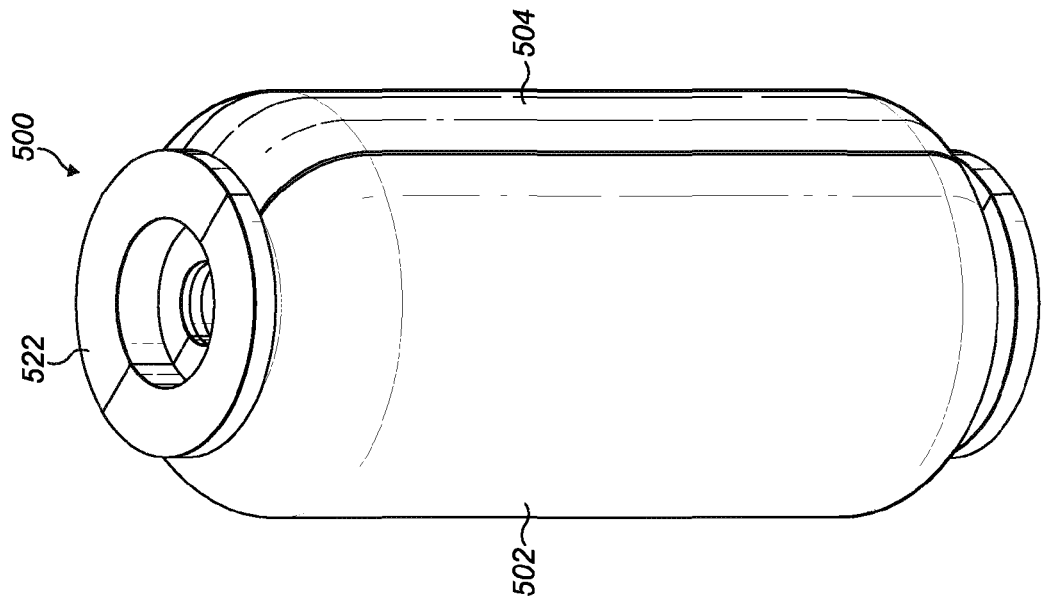
FIG. 8 illustrates a buoyancy compensating element.
Figure 7:
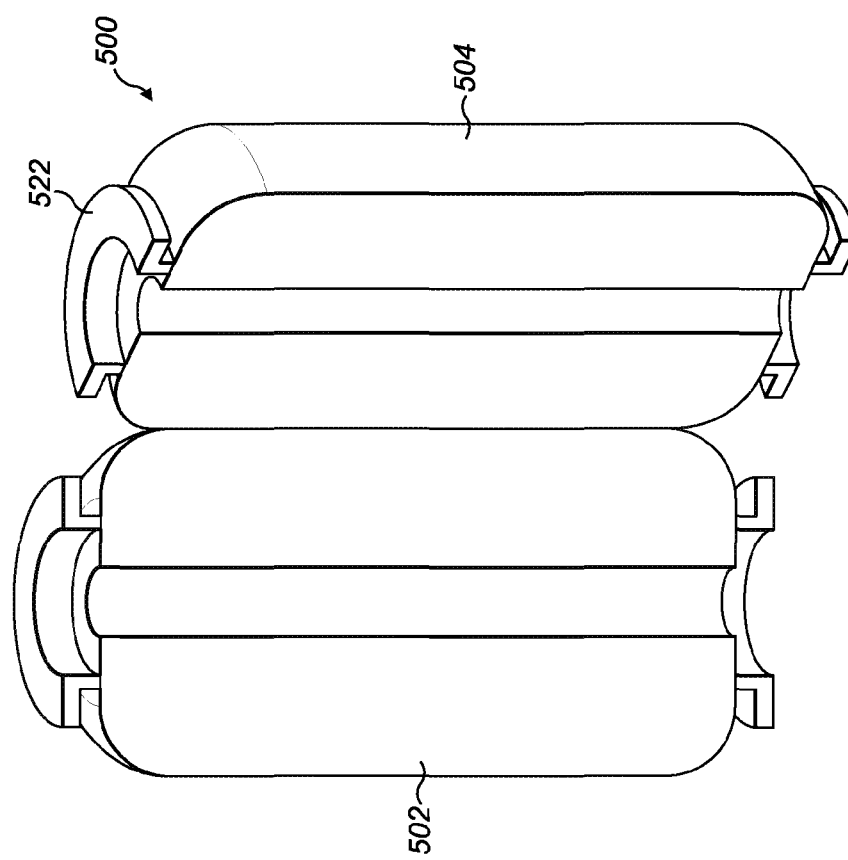
FIG. 7 illustrates two body portions of a buoyancy compensating element.
Figure 9:
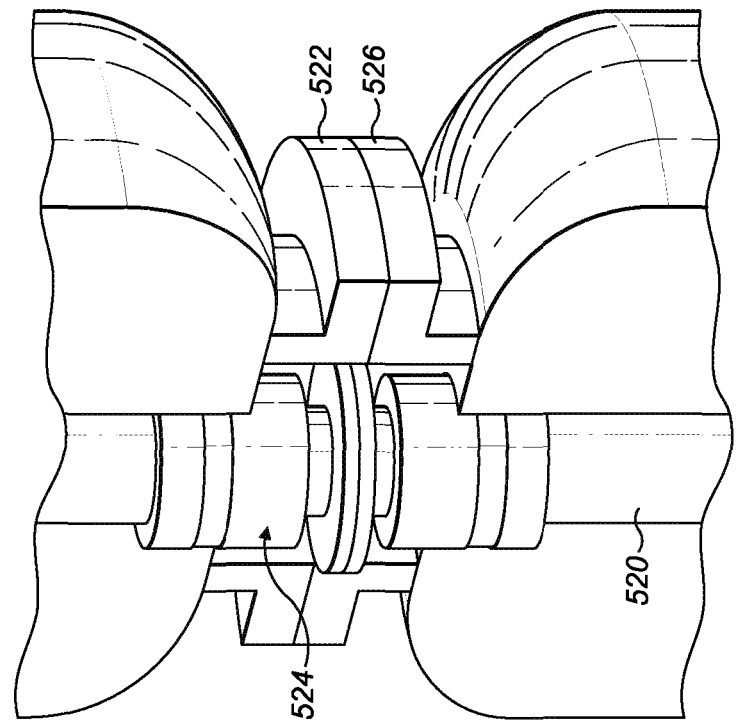
FIG. 9 illustrates buoyancy compensating elements connected to a midline connection.

As shown in FIGS. 7 to 9, the buoyancy compensating element 500 may also include one or more connectors or flanges for connecting the buoyancy compensating element to further components. A connector 522 is illustrated in the buoyancy compensating element of FIGS. 7 and 8. FIG. 7 shows two body portions 502,504 for forming a buoyancy compensating element 500 and FIG. 8 shows the body portions 502,504 in their connected state. The connectors may be any suitable configuration, for example in the shape of a flange protruding from the first and/or second end surfaces 506,508 with appropriate means to connect the flange to the further component, which could be a further buoyancy compensating element or a part of the flexible pipe.

FIG. 9 illustrates a cutaway portion of two buoyancy compensating elements enveloping a flexible pipe in the region of a midline connection. A connector 522 is arranged to connect with a midline connection 524 of a flexible pipe 520. Here the midline connection 524 is a pair of end fittings joined in a back to back configuration. The connector 522 securely clamps on to the midline connection 524 to form a firm join between the two components. Since the buoyancy compensating element is clamped to the midline connection, which is a rigid structure, excessive crushing loads are not applied to the flexible pipe body. The connector 522 may also be connectable to a further connector 526 of a further buoyancy compensating element, as shown.

Figure 10:
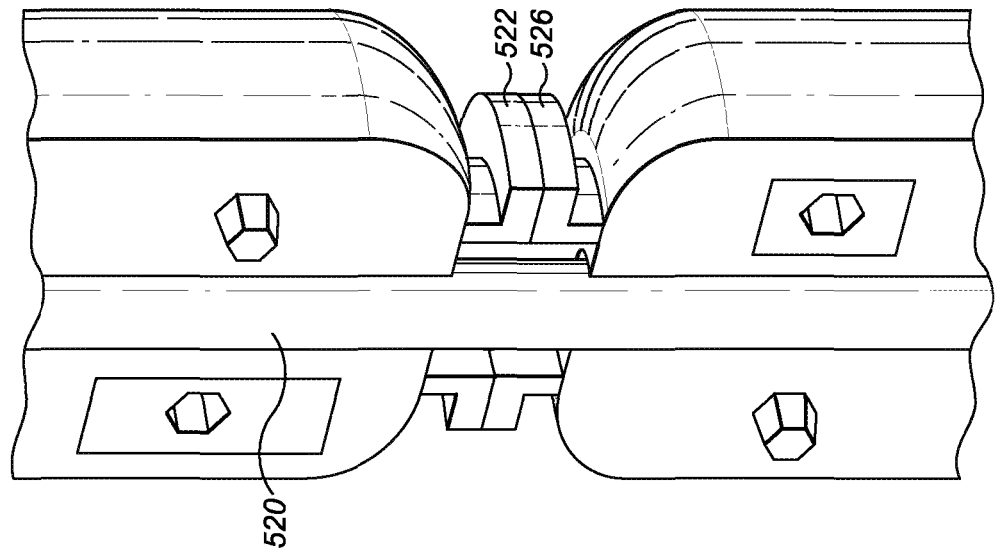
FIG. 10 illustrates buoyancy compensating elements connected to a flexible pipe body.

FIG. 10 illustrates a cutaway portion of two buoyancy compensating elements enveloping a flexible pipe in the region of the flexible pipe body (without a midline connector). A connector 522 is arranged to connect with a further connector 526 of a further buoyancy compensating element.

It is envisaged that the type of connector to connect with a midline connection and the connector to connect with a flexible pipe body may be the same configuration, with the ability to connect to either one component, or to both of these components. The means of forming a connection between the connector and the midline connection or further connector may be any kind of mechanical fitting (screw type, male/female type, etc), a bolting arrangement or other such means. Any forces generated by the inertia between the buoyancy compensating element and the flexible pipe will be transferred through the connector and the midline connection.

Figure 11:
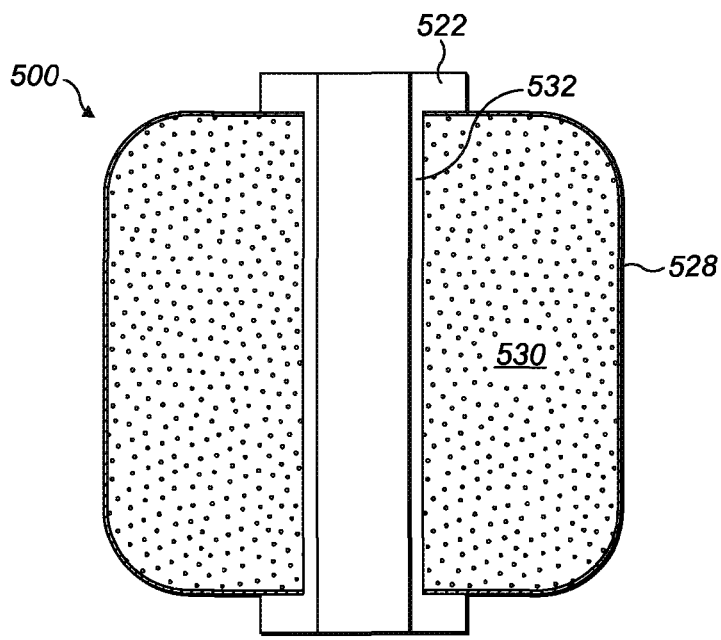
FIG. 11 illustrates a cross-section of a buoyancy compensating element.

FIG. 11 illustrates a cross-section of a buoyancy compensating element 500. In this example the buoyancy compensating element 500 includes a protective shell 528 to cover the outer surfaces of the body portions. The shell may be formed from steel or any other material, such as composite, that will give an amount of protection to the buoyancy compensating element from seawater. The bulk of the body portions are in this case syntactic foam 530. An additional component of this example is a radially inner layer 532, which is provided along the semi-cylindrical cutaway portion 516. The layer is of steel and is sufficient to form a friction-resistant interface between the syntactic foam body and a flexible pipe. The layer 532 may be formed sufficiently rigid so as to prevent the portion of flexible pipe that is enveloped by the buoyancy compensating element from bending in use.

A buoyancy compensating element such as one described above may be provided for connection to a flexible pipe. The method of providing the buoyancy compensating element includes providing a first body portion; and providing a further body portion, wherein the first and further body portion are configured to be connectable to each other and in use to encompass a portion of flexible pipe. The method may include manufacturing the buoyancy compensating element, or providing the components for assembly.

Figure 12:
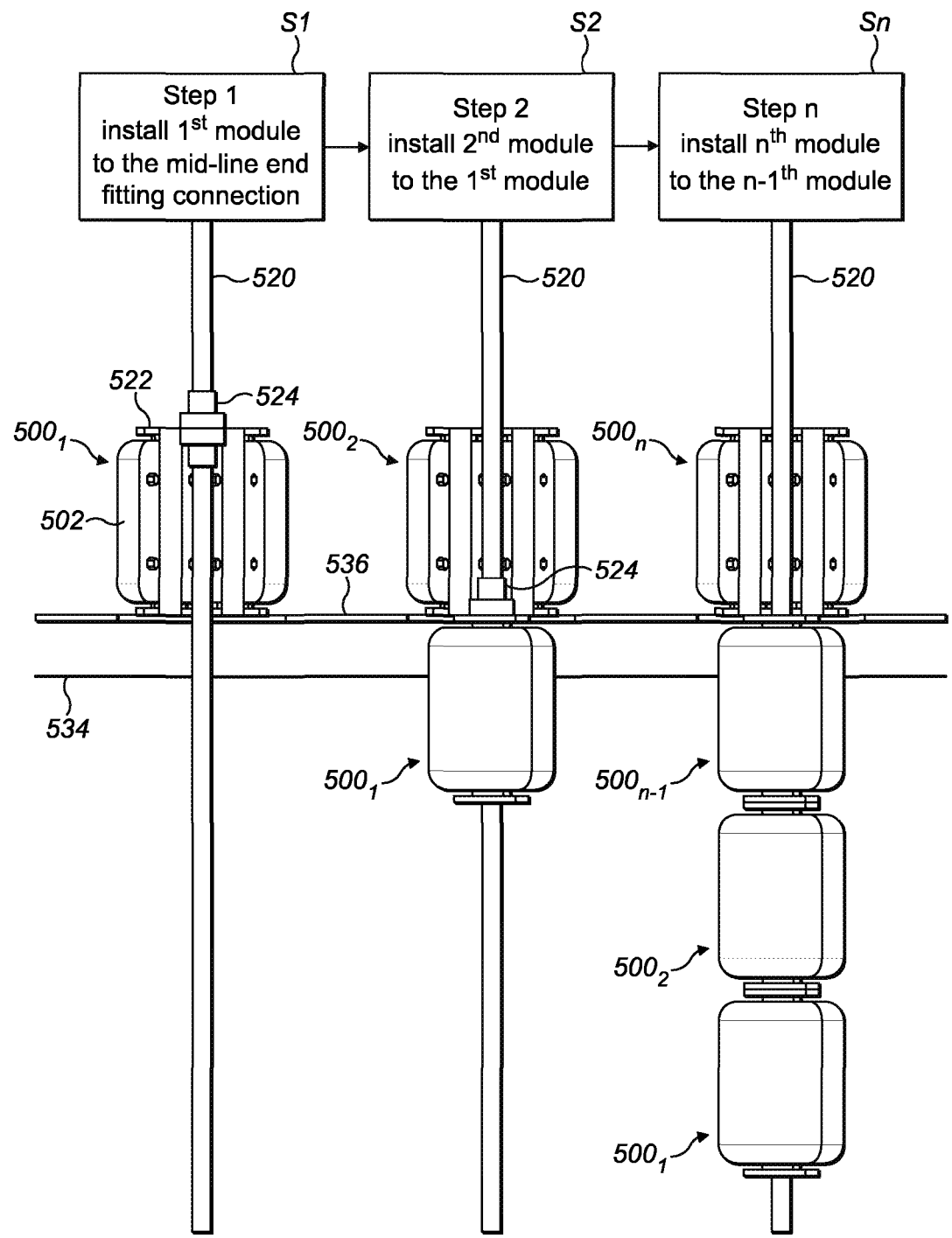
FIG. 12 illustrates a method of attaching buoyancy compensating elements to a flexible pipe.

In view of the different types of connector discussed above, it will be appreciated that a number of buoyancy compensating elements may be attached to a flexible pipe in an in-line configuration. An example of this method is illustrated in FIG. 12. In this example, the buoyancy compensating elements are attached to the flexible pipe 520 offshore, just prior to being lowered into the water 534 via a moon pool 536. In a first step S1, a first body portion 502 and a further body portion 504 are brought together, connected to each other to from a first buoyancy compensating element $500_1$, and connected to a lowermost section of a midline connection 524. The connection of the body portions to each other and to the midline connection may be performed in any order. In a second step S2, a further buoyancy compensating element $500_2$ is connected to the uppermost section of the midline connection 524 and/or to the first buoyancy compensating element $500_1$. Again the connection of the body portions of the further buoyancy compensating element $500_2$ to each other and the connection of the body portions to the assembly may be performed in any order. In subsequent steps Sn, a further buoyancy compensating element $500_{n-1}$ is connected to the further buoyancy compensating element $500_2$ via respective connectors, and the further buoyancy compensating element $500_{n-1}$ is connected to the further buoyancy compensating element $500_n$ via respective connectors, and so on.

With such a method, the first buoyancy compensating element $500_1$ is secured to the flexible pipe via the midline connection 524, and further buoyancy compensating elements are secured in sequence to the first buoyancy compensating element or the midline connection. As such, any forces from the later-added buoyancy compensating elements are transmitted through earlier-added buoyancy compensating elements to the midline connection. This helps prevent excessive compression loads on the flexible pipe from the buoyancy compensating elements. In addition, since the first added buoyancy compensating element is attached to the midline connection, it will not slide down the flexible pipe to an unwanted position, and since further buoyancy compensating elements are added in sequence above the first buoyancy compensating element, the first buoyancy compensating element acts as a guide stop to prevent the further buoyancy compensating elements from slipping down the flexible pipe.

Furthermore, when using buoyancy compensating elements including the rigid layer 532, the combination of each rigid layer would form a rigid tube external to the pipe and enclosing the pipe along the length of the buoyancy compensating elements. This could be used effectively as a single guide tube or I-tube.

In an alternative method, a series of buoyancy compensating elements could be added to a flexible pipe hanging between a vessel and a midwater platform, for example, with the final buoyancy compensating element being connected to a midline connection. Then, the flexible pipe could be released from the vessel such that the pipe hangs from the midwater platform in essentially an inverted manner.

Figure 13:
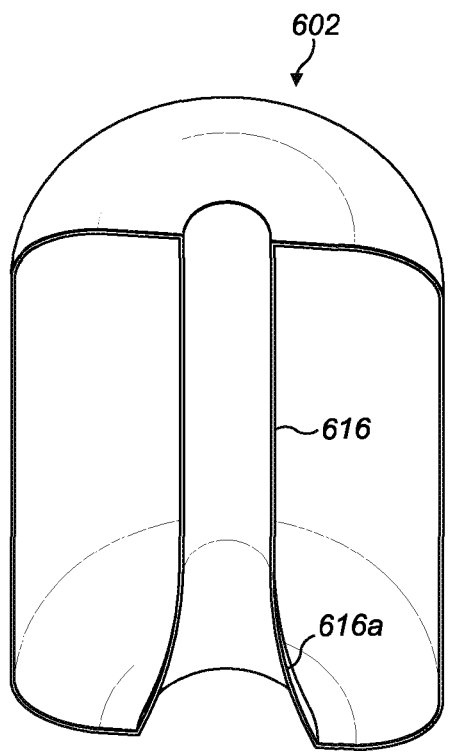
FIG. 13 illustrates a body portion of a buoyancy compensating element.
Figure 14:
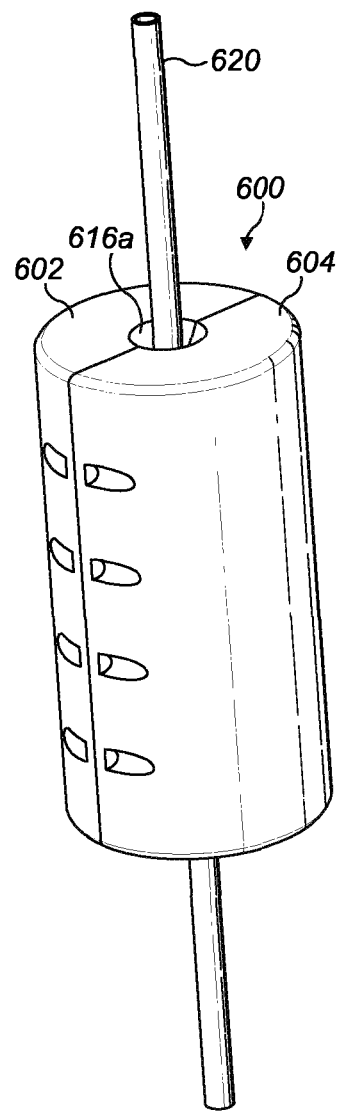
FIG. 14 illustrates a buoyancy compensating element.

In a further modification to the apparatus described above, a buoyancy compensating element 600 may be provided as shown in FIGS. 13 and 14. As shown in the figures, the buoyancy compensating element 600 is similar in many ways to the buoyancy compensating element 500, and is similarly formed of two connectable body portions 602,604 each with a cutaway portion 616 that forms a channel upon connection with the other body portion. The channel extends through the buoyancy compensating element 600 to receive a flexible pipe. However, in this example, the cutaway portion 616 of each body portion is formed to include a section 616a that gradually increases in diameter towards an end of the body portion in a bellmouth type profile. Along the section 616a, the channel formed by connecting the body portions together gradually flares open, and the buoyancy compensating element 600 will not abut with the flexible pipe 620. That is, a cross-section of the section 616a includes a curved surface, which may have varying (increasing or decreasing) or constant radius of curvature approaching the end of the body portion. In FIGS. 13 and 14, the section 616a extends approximately one fifth of the length of the buoyancy compensating element, though the specific dimensions may be determined by one skilled in the art depending on the particulars of the application.

Figure 15:
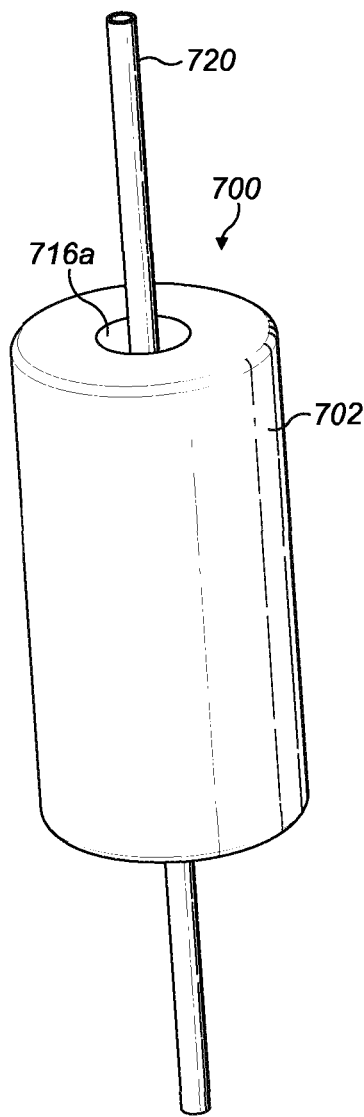
FIG. 15 illustrates a buoyancy compensating element.

In a yet further example, a buoyancy compensating element 700 may be provided as shown in FIG. 15. The buoyancy compensating element 700 is similar in many ways to the buoyancy compensating element 600, but is formed of a single body portion 702 with a channel extending through the body portion to receive a flexible pipe. The channel is formed to include a section 716a that gradually increases in diameter towards an end of the body portion in a bellmouth type profile. Along the section 716a, the buoyancy compensating element 700 will not abut with the flexible pipe 720.

The section 616a,716a of the buoyancy compensating element with a bellmouth type profile gives the portion of flexible pipe enclosed by the buoyancy compensating element an increasing amount of space between the channel and the pipe, giving the pipe an increasing ability to flex and bend towards that end of the channel. In this respect, the section of the buoyancy compensating element acts as a bend limiting element, allowing a gradual change in flexibility of the flexible pipe from where it is constrained beneath the buoyancy compensating module, to where it is completely open to the surroundings (sea water for example). This feature therefore removes the need to use an additional bend stiffener in this region of the flexible pipe.

A person skilled in the art will appreciate that the shaped, bellmouth type profile is a way of achieving a gradual change in constraint on the portion of flexible pipe surrounded by the buoyancy compensating element. However, this change could also be accomplished by other means, such as forming the buoyancy compensating element from a material that has a changing compressibility, such as a foam with increasing pore size, so that compressibility increases towards the end of the channel. This would also allow the portion of flexible pipe an increasing ability to flex as it reaches the end of the channel.

Figure 16:
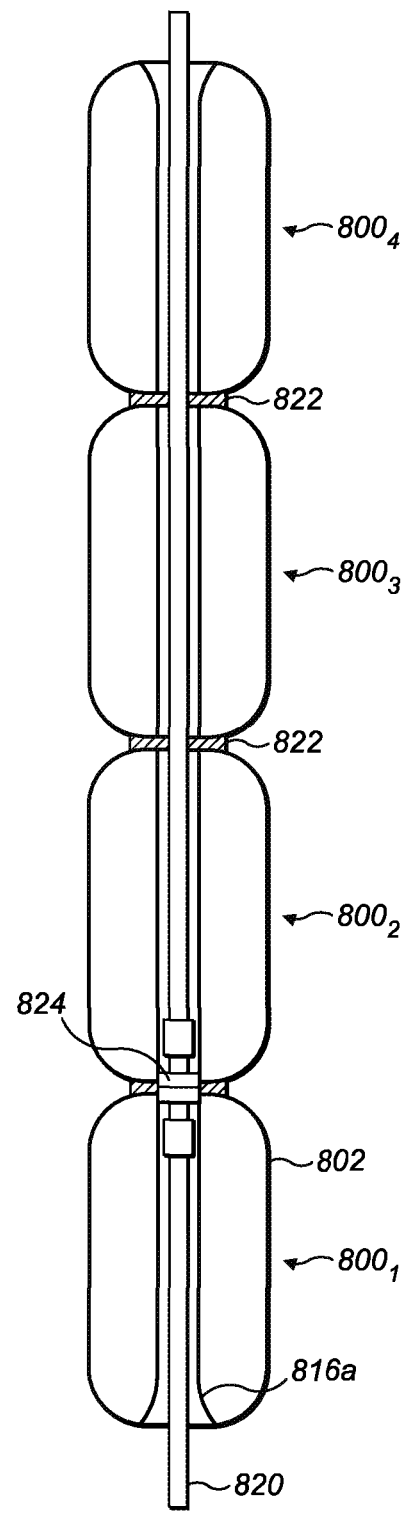
FIG. 16 illustrates an assembly of buoyancy compensating elements on a flexible pipe.

In a further modification to the apparatus, a number of different buoyancy compensating elements may be attached to a flexible pipe 820 in an in-line configuration. An example of this arrangement is illustrated in cross-section in FIG. 16. In this example, the buoyancy compensating elements are attached to the flexible pipe 820 offshore, just prior to being lowered into the water via a moon pool (not shown). Firstly, a first body portion 802 and a further body portion (not shown) are brought together, connected to each other to from a first buoyancy compensating element $800_1$, and connected to a lowermost section of a midline connection 824. The connection of the body portions to each other and to the midline connection may be performed in any order. For this first buoyancy compensating element, a buoyancy compensating element of the type shown in FIGS. 13 and 14 is employed, with the section of flared channel 816a provided at the end of the channel distal to the midline connection 824. Then, a second buoyancy compensating element $800_2$ is connected to the uppermost section of the midline connection 824 and/or to the first buoyancy compensating element $800_1$. However, this buoyancy compensating element $800_2$ is of the type shown in FIG. 7, 8 or 11 for example without any flared section of channel. Again the connection of the body portions of the second buoyancy compensating element $800_2$ to each other and the connection of the body portions to the assembly may be performed in any order. Then, a third buoyancy compensating element $800_3$ of the type shown in FIG. 7, 8 or 11 for example is connected via respective connectors 822 to the second buoyancy compensating element $800_2$. Then, a fourth buoyancy compensating element $800_4$ of the type shown in FIGS. 13 and 14 for example is connected via respective connectors 822 to the third buoyancy compensating element $800_3$.

Similarly to the arrangement described with respect to FIG. 12, the first buoyancy compensating element $800_1$ is secured to the flexible pipe via the midline connection 824, and further buoyancy compensating elements are secured in sequence to the first buoyancy compensating element or the midline connection. As such, any forces from the later-added buoyancy compensating elements are transmitted through earlier-added buoyancy compensating elements to the midline connection. This helps prevent excessive compression loads on the flexible pipe from the buoyancy compensating elements. In addition, since the first added buoyancy compensating element is attached to the midline connection, it will not slide down the flexible pipe to an unwanted position, and since further buoyancy compensating elements are added in sequence above the first buoyancy compensating element, the first buoyancy compensating element acts as a guide stop to prevent the further buoyancy compensating elements from slipping down the flexible pipe.

Furthermore, when using buoyancy compensating elements including a rigid inner layer, the combination of each rigid layer would form a rigid tube external to the pipe and enclosing the pipe along the length of the buoyancy compensating elements. This could be used effectively as a single guide tube or I-tube.

It is possible to use centralizers inside the formed assembly so as to maintain the relative positions of the buoyancy compensating elements against the pipe. Centralizers are known in the art and may be positioned at predetermined intervals along a pipe.

What's more, the use of the buoyancy compensating elements having a flared channel at the uppermost and lowermost sections of the assembly enables the enclosed portion of flexible pipe to be relatively rigidly protected along its central section, and then have an increasing ability to flex and bend towards those sections of the assembly.

Figure 17:
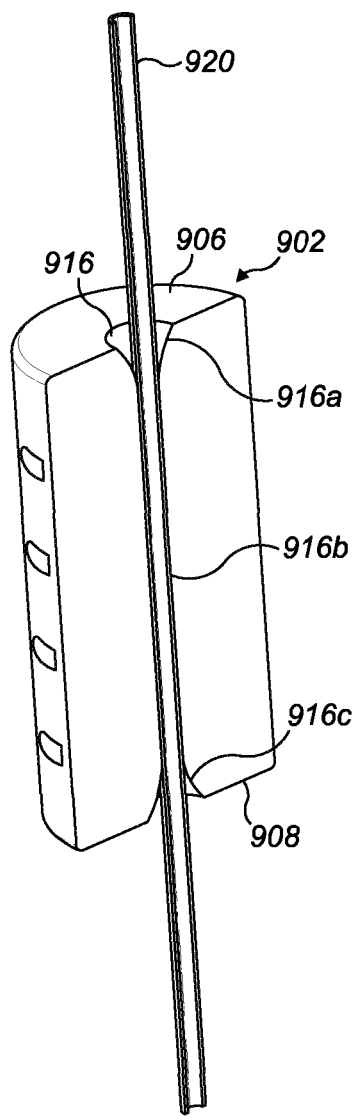
FIG. 17 illustrates a body portion of a buoyancy compensating element.
Figure 18:
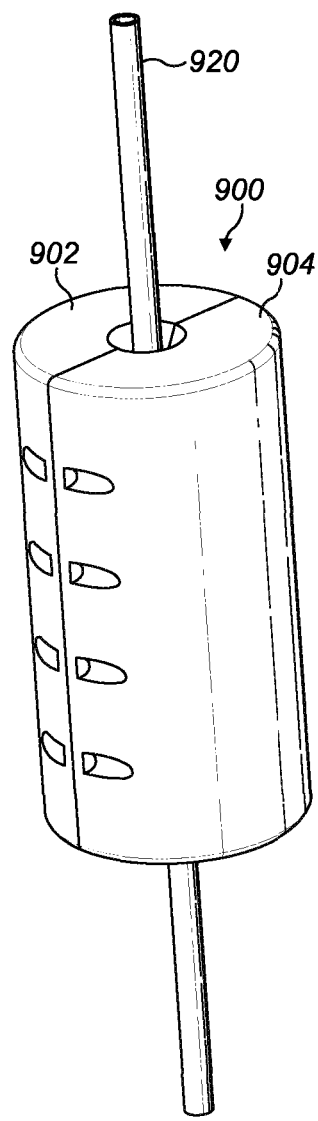
FIG. 18 illustrates a buoyancy compensating element.

Another example of a buoyancy compensating element is illustrated in FIGS. 17 and 18. In this example, a buoyancy compensating element 900 includes a first body portion 902 and a further body portion 904. The body portions are connectable to each other to form the buoyancy compensating element 900. In the example shown, the buoyancy compensating element is split into two substantially identical portions. Alternatively, the buoyancy compensating element could be formed from a single body portion.

The buoyancy compensating element 900 shares features similar to the buoyancy compensating element described with reference to FIGS. 13 and 14, for example. Each body portion 902,904 includes a cutaway portion 916 that is of varying profile dimensions. More specifically, the cutaway portion 916 extends between first and second end surfaces 906,908. The cutaway portion has a first, end section 916a adjacent the first end surface 906 that gradually increases in diameter towards the first end 906 in a bellmouth type profile. Along the section 916a, the channel formed by connecting the body portions together gradually flares open, and the buoyancy compensating element 900 will not abut with the flexible pipe 920. Adjacent to the first section 916a is a second, central section 916b that is semi-cylindrical. The second, central section 916b will generally lie in contact with the flexible pipe 920. Adjacent to the second section 916b is a third, end section 916c that gradually increases in diameter towards the second end 908 in a bellmouth type profile. Along the section 916c, the channel formed by connecting the body portions together gradually flares open, and the buoyancy compensating element 900 will not abut with the flexible pipe 920.

The buoyancy compensating element 900 may be used in a stand-alone manner and includes bend limiting features which will obviate the requirement for separate bend stiffeners.

Figure 19:
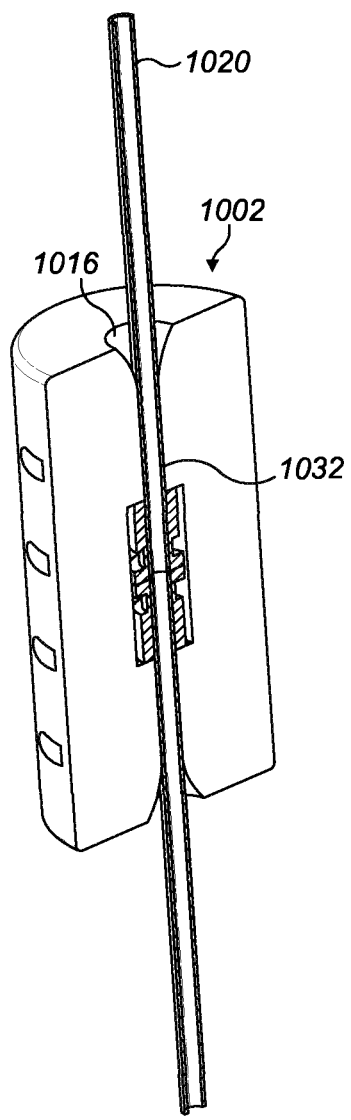
FIG. 19 illustrates a body portion of a buoyancy compensating element.
Figure 20:
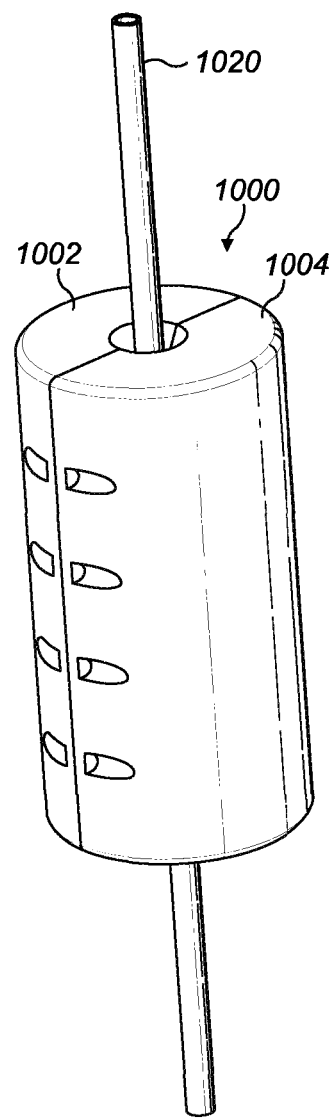
FIG. 20 illustrates a buoyancy compensating element.

A further example of a buoyancy compensating element is illustrated in FIGS. 19 and 20. In this example, a buoyancy compensating element 1000 includes a first body portion 1002 and a further body portion 1004. The body portions are connectable to each other to form the buoyancy compensating element 1000. The buoyancy compensating element 1000 is similar to the buoyancy compensating element 900. However, the cutaway portion 1016 of each body portion is configured (shaped and sized) so that the buoyancy compensating element will fit around a midline connection of the flexible pipe 1020.

The buoyancy compensating element 1000 may be provided with a radially inner layer 1032 along the cutaway portion 1016. Here the layer is of steel and not only accommodates the geometry of the midline connection, but also adds stiffness to the structure so that the buoyancy compensating element can withstand any potential deformation from the forces between the buoyancy compensating element and the flexible pipe. The layer 1032 may be formed sufficiently rigid so as to prevent the portion of flexible pipe that is enveloped by the buoyancy compensating element from bending in use, whilst the end sections allow increasing flexibility to the pipe towards the end surfaces of the buoyancy compensating element.

With this apparatus, dynamic forces may be transferred through the end fittings of the midline connection. Also, the forces clamping the body portions to the flexible pipe are directed around the midline connection, which is rigid, such that compressive loads are not excessive and crush the flexible pipe. In addition, the apparatus removes the requirement for separate bend stiffeners to be used in the assembly, which normally must be installed on a flexible pipe at the manufacturing facility.

Since bend stiffeners are omitted from the assembly, there are positive implications relating to pipe production, in terms of reduced time for awaiting parts, transportation of the assembly, risk of damage to the assembly, and cost. The buoyancy compensating element can be retrofitted to a flexible pipe offshore.

It will be appreciated that the profile of the part of the buoyancy compensating element that allows a flexible pipe increasing flexibility can be designed so as to suit the pipe dimensions, midline connection dimensions, allowable bending radii (which may depend on subsea conditions for example), and so on.

Various modifications to the detailed designs as described above are possible. For example, whilst the above-described buoyancy compensating elements include syntactic foam, the buoyancy providing material could instead be air, gas, or other material, or a combination of materials, to give suitable positive buoyancy. Alternatively the material could be a suitable ballast weight such as sand, grit, or a metal or alloy, e.g. lead or steel in pellet form or other suitable shape.

Other materials described are also for example only. It will be understood that whilst some of the buoyancy compensating elements described above are formed from two body portions, they could be formed from a single body portion or three or more body portions.

As described above, two or more buoyancy compensating elements can be joined together for example by respective connector portions, to form an in-line configuration of buoyancy compensating elements. Whilst four buoyancy compensating elements have been described with respect to FIG. 16, any number of buoyancy compensating elements can be used, though it would be advantageous to use a buoyancy compensating element with a flared portion at the beginning and end of the configuration so as to achieve bending control.

Whilst some examples of the present invention have been described with a connector at each end of the body portion, it will be realised that a buoyancy compensating element may have only one connector that is configured to mate with a corresponding portion of a body of an adjacent buoyancy compensating element. Alternatively, the body portion itself may be configured to mate with a corresponding portion of a body of an adjacent buoyancy compensating element.

With previously known pipe assemblies, a combination of dissimilar components is required to achieve buoyancy control and bending stiffness. The present invention provides both of these features using similar and fewer components. The buoyancy compensating elements will be cost effective in terms of onshore fabrication and offshore installation.

The invention will be particularly useful in reducing riser tension and lead to further benefits in terms of the requirements for a tensile armour layer.

The invention will optimize the function of limiting bending curvature in the pipe exiting a buoyancy compensating element.

With a buoyancy compensating element split into two or more body portions, the buoyancy compensating element can be easily retrofitted to a flexible pipe at the time of installation, just prior to a flexible pipe being lowered into the sea for example.

The above-described buoyancy compensating elements can be adapted to link with further buoyancy compensating elements fitted to a flexible pipe to form a length of buoyancy-providing assembly, yet the set of buoyancy compensating elements only attaches to the flexible pipe at a midline connection, which is a rigid portion of the pipe. Thus excessive crushing forces are not applied to the flexible pipe at sections of the pipe that are not rigid. The assembly may also act as a guide tube to the pipe.

The above-described buoyancy compensating element or elements may provide a riser system with reduced tension loads that is easy to assemble and cost effective. The apparatus shown in FIG. 16 for example is particularly suitable for deep and ultra deep water applications, and the apparatus shown in FIG. 5 for example is particularly suitable for more shallow water applications. However a person skilled in the art will realise that any of the above described examples may be designed to suit the particular application. In a traditional application such as a shallow water wave configuration, the pipe bending at the buoyancy module is rather negligible due to 1) the net buoyancy of each module is relatively small (e.g. 2,000 kg maximum) and more evenly distributed over a relative long pipe section, and 2) buoyancy modules are most likely positioned almost horizontally or with some slope (in a sag bend formation). Therefore, only very flat curves are designed at the ends of the traditional buoyancy module. The bending radius of these curved sections is tens or hundreds times of the pipe minimum bending radius and is not really designed to protect the pipe from overbending. For a stepped riser configuration, the buoyancy modules may be placed in an almost vertical section. The pipe could experience high bending at the top end of the buoyancy section by forming 'a step'. The radius of the bellmouth profile at the end of these large modules are typically no less than 1.25 times of the pipe bending radius.

Buoyancy compensating elements could be applied for use at 1000 or 2000 or even 3000 meters water depth for example. The net buoyancy of each buoyancy compensating element may be 10 tonnes (10,000 kg) for example. When using an in-line configuration of buoyancy compensating elements, the net buoyancy may be 100 tonnes for example. The dimensions of the buoyancy compensating element may be around 3.5 meters outside diameter and 3 meters long, for example. Particular dimensions will also depend upon the depth of water that the pipe is required to be used in.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An assembly comprising:
a plurality of buoyancy compensating elements for connection to a portion of flexible pipe for increasing or decreasing buoyancy of the portion of flexible pipe, wherein the plurality of buoyancy compensating elements are connected together in an in-line configuration, a first buoyancy compensating element at an end of the in-line configuration comprising:
a body portion;
a channel extending through the body portion for receiving a portion of flexible pipe;
wherein the channel comprises a section shaped to increase in diameter towards an end of the channel; and
wherein the channel comprises a bellmouth profile towards the end of the channel; and
wherein the body portion and channel are configured such that when the portion of flexible pipe is received in the channel, the portion of flexible pipe has increasing ability to flex towards the end of the channel,
wherein at least one of the plurality of buoyancy compensating elements is connected to the flexible pipe via a midline connection of the portion of flexible pipe.

2. An assembly as claimed in claim 1, wherein the channel of the first buoyancy compensating element comprises a further section shaped to increase in diameter towards a further end of the channel.

3. An assembly as claimed in claim 1, wherein the body portion of the first buoyancy compensating element comprises a first body portion and a further body portion, and the first and further body portion are configured to be connectable to each other.

4. An assembly as claimed in claim 3, wherein the channel of the first buoyancy compensating element is shaped to envelop the midline connection of the portion of flexible pipe.

5. An assembly as claimed in claim 1, wherein the body portion of the first buoyancy compensating element comprises a connector connecting the first buoyancy compensating element to a further buoyancy compensating element or to the midline connection of the portion of flexible pipe.

6. A method of providing an assembly comprising a plurality of buoyancy compensating elements for connection to a portion of flexible pipe for increasing or decreasing buoyancy of the portion of flexible pipe, the method comprising:

connecting a first buoyancy compensating element to a mid-line connection of a portion of flexible pipe;

connecting at least one further buoyancy compensating element to the first buoyancy compensating element or the mid-line connection of the portion of flexible pipe such that the first and further buoyancy compensating elements are connected together in an in-line configuration;

wherein at least the first buoyancy compensating element comprises:

a body portion;

a channel extending through the body portion for receiving the portion of flexible pipe;

wherein the channel is shaped to comprise a section that increases in diameter towards an end of the channel in a bellmouth type profile; and wherein the body portion and channel are configured such that when the portion of flexible pipe is received in the channel, the portion of flexible pipe has increasing ability to flex towards the end of the channel.

\* \* \* \* \*